US 006711007B2

(12) United States Patent
Syring et al.

(10) Patent No.: US 6,711,007 B2
(45) Date of Patent: Mar. 23, 2004

(54) COMPUTER WITH A MECHANISM FOR SECURING A STORAGE MEDIUM DRIVE AND A MOTHER BOARD

(75) Inventors: Harold Syring, Temple, TX (US); Rex Karl, Temple, TX (US)

(73) Assignees: Acer Incorporated, Taipei Hsien (TW); Wistron Corp., Shijr (TW)

( * ) Notice: Subject to any disclaimer, the term of this patent is extended or adjusted under 35 U.S.C. 154(b) by 67 days.

(21) Appl. No.: 10/067,678

(22) Filed: Feb. 4, 2002

(65) Prior Publication Data

US 2003/0147207 A1 Aug. 7, 2003

(51) Int. Cl.[7] .................................................. G06F 1/16
(52) U.S. Cl. ...................... 361/683; 361/679; 361/686; 361/724; 360/97.01; 312/332.1
(58) Field of Search ................... 361/679, 683, 361/686, 724–729, 732, 740, 747, 731, 681; 360/97.01, 98.01, 137, 137 D; 312/332.1, 333, 223.1, 223.2, 223.3; 292/132, 175, 163, 145, 164, 42, 33; 70/36 A, 38 C; G06F 1/16

(56) References Cited

U.S. PATENT DOCUMENTS

| | | | | | |
|---|---|---|---|---|---|
| 4,864,469 | A | * | 9/1989 | Boudon | 361/685 |
| 5,136,468 | A | * | 8/1992 | Wong et al. | 361/683 |
| 5,338,214 | A | * | 8/1994 | Steffes et al. | 439/160 |
| 5,438,476 | A | * | 8/1995 | Steffes | 361/683 |
| 5,754,396 | A | * | 5/1998 | Felcman et al. | 361/683 |
| 5,784,251 | A | * | 7/1998 | Miller et al. | 361/683 |
| 5,785,398 | A | * | 7/1998 | Park | 312/223.2 |
| 5,823,644 | A | * | 10/1998 | Suh et al. | 312/223.2 |
| 6,301,099 | B1 | * | 10/2001 | Felcman et al. | 361/683 |

* cited by examiner

*Primary Examiner*—Michael Datskovsky
(74) *Attorney, Agent, or Firm*—Ladas & Parry

(57) ABSTRACT

A computer with a security mechanism, for securing a motherboard and a storage medium drive such as a hard disk, is provided. The computer comprises a chassis, a pan, a first latch, a locking mechanism and a lock. The pan, disposed under the chassis, has the motherboard mounted thereon. The first latch, moveably disposed at the chassis, detachably engages the pan so that the pan combines with the chassis. The hard disk drive is accessibly disposed on the chassis. The locking mechanism is moveably disposed at the chassis to lock the hard disk drive in a separable manner.

19 Claims, 5 Drawing Sheets

COMPUTER WITH A MECHANISM FOR SECURING A STORAGE MEDIUM DRIVE AND A MOTHER BOARD

BACKGROUND OF THE INVENTION

1. Field of the Invention

The invention relates to a computer with a mechanism for securing a motherboard and a storage medium drive; in particular, the invention relates to a computer whose readily removable motherboard and hard disk drive can easily be secured against unauthorized removal.

2. Description of the Related Art

Computer systems can usually be defined as a desktop, freestanding, or portable microcomputer that includes a system unit having a system processor with associated volatile and non-volatile memory, a display monitor, a keyboard, a hard disk storage device or other type of storage media such as a floppy disk drive or a compact disk read only memory (CD ROM) drive. One of the distinguishing characteristics of these systems is the use of a system board or motherboard to electrically connect these components together. A computer system is an information handling system designed primarily to give computing power to groups of users and is generally purchased by small and large business.

Several problems arise with existing servers that have removable systems. One problem is that space in the individual computer is at a premium. Therefore, there is a need to maximize the density of the components in the system. In computer systems, maximizing the density causes layering of components. Layering causes accessibility problems during assembly and servicing of the system.

Furthermore, the motherboard is typically mounted to the floor of the chassis of the computer. The motherboard is usually obstructed by many connecting components and cables attached to the components. During the removal of the motherboard, the cables, attached to the components, must be manipulated, and removal of screws from the motherboard is difficult and cumbersome. Hence, it is difficult to maneuver the motherboard past all the internal components and cables for removal.

SUMMARY OF THE INVENTION

In order to address the aforementioned disadvantages, the invention provides a computer whose readily removable motherboard and hard disk drive can easily be secured against unauthorized removal.

Accordingly, the invention provides a computer that comprises a chassis, a pan and a first latch. The pan, disposed under the chassis, has the computer motherboard mounted thereon. The first latch, moveably disposed at the chassis, detachably engages the pan so that the pan combines with the chassis.

In a preferred embodiment, the chassis is provided with a first port, and the pan is provided with a latch slot. The first latch is provided with a slide portion, protruding from the first port, and a hook portion detachably engaging the latch slot.

Furthermore, the computer comprises a storage medium drive such as a hard disk drive, a locking mechanism. The hard disk drive is accessibly disposed on the chassis. The locking mechanism, moveably disposed at the chassis, connects to the first latch to lock the hard disk drive by the movement of the first latch.

Furthermore, the locking mechanism comprises a rod and a second latch. The rod is moveably disposed at the chassis and held by the slide portion and the hook portion of the first latch. The second latch, connecting to the rod, is rotatably disposed at the chassis and used for locking the hard disk drive. The rod moves to rotate the second latch to lock the hard disk drive when the first latch moves to rotate the rod.

Furthermore, the rod is provided with an abutting portion and the chassis is provided with a support, and the locking mechanism further comprises a spring. The spring, surrounding the rod and abutting the abutting portion and the support, is used for restricting the rod to move in a predetermined range.

Furthermore, the computer further comprises a retainer for connecting the slide portion and the hook portion of the first latch. The retainer may be an O-ring.

In another preferred embodiment, the chassis is provided with at least one hook slot, and the pan is provided with at least one hook corresponding to and engaging the hook slot.

In another preferred embodiment, the chassis is provided with at least one groove, and the pan is provided with at least one tongue corresponding to and engaging the groove.

In another preferred embodiment, the computer comprises a latch housing, disposed on the chassis, for positioning the first latch and guiding the movement of the first latch.

Furthermore, the chassis is provided with at least one through hole, and the latch housing is provided with at least one protrusion corresponding to and engaging the through hole.

In another preferred embodiment, the chassis is provided with a second port, and the second port is blocked off by the first latch when the first latch does not engage with the pan.

Furthermore, this invention provides a security mechanism adapted for a computer with a chassis, a pan and a hard disk drive. The security mechanism comprises a first latch, and a locking mechanism. The first latch, moveably disposed at the chassis, detachably engages the pan so that the pan combines with the chassis. The locking mechanism, moveably disposed at the chassis, connects to the first latch to lock the hard disk drive by the movement of the first latch.

BRIEF DESCRIPTION OF THE DRAWINGS

The invention is hereinafter described in detail with reference to the accompanying drawings in which.

DETAILED DESCRIPTION OF THE INVENTION

Figure 1A:
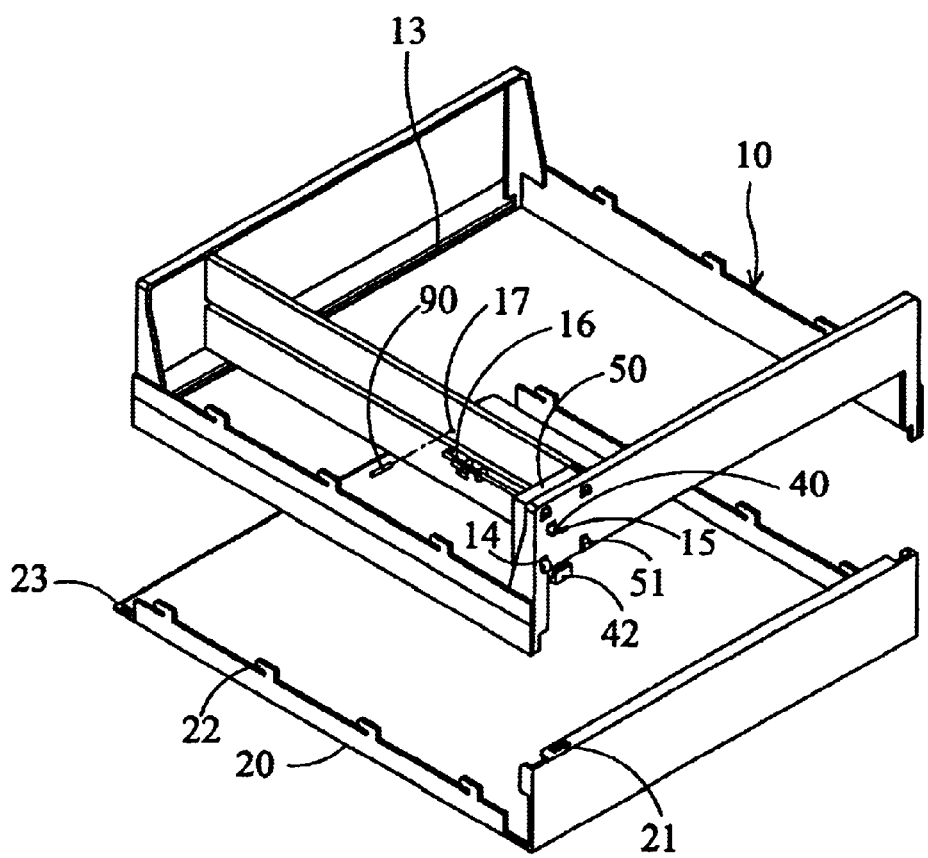
FIG. 1a is an exploded diagram depicting a computer as disclosed in this invention.
Figure 1B:
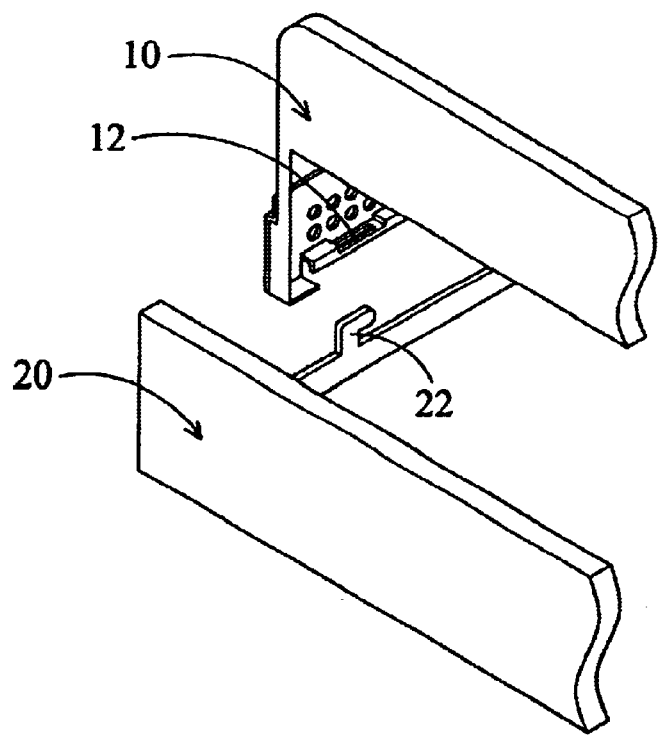
FIG. 1b is an enlarged view depicting a computer as disclosed in this invention.
Figure 1C:
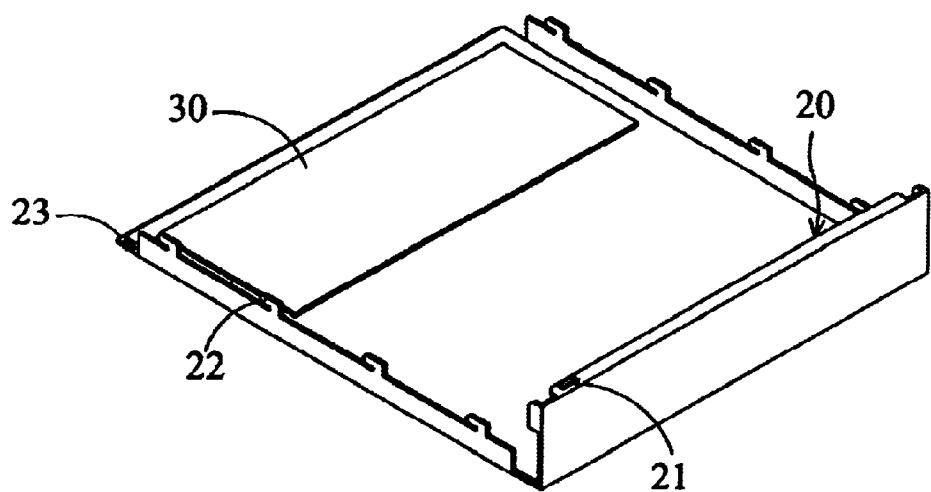
FIG. 1c is a schematic view depicting a lower pan as disclosed in this invention.

Referring to FIG. 1a, FIG. 1b and FIG. 1c, a computer 100, as disclosed in this invention, comprises a chassis 10, a pan 20, a first latch 40 and a latch housing 50.

The chassis 10 is a basic frame of the computer 100, and is provided with a first port 11, a plurality of hook slots 12 a groove 13, four through holes 14, a second port 15, a support 16 and a pin hole 17. As shown in FIG. 1b, the hook slots 12 are formed at lower edges of the chassis 10 on both sidewalls. The groove 13 is formed at the lower edge of the chassis 10 on the front wall as shown in FIG. 1a.

The pan 20, detachably disposed under the chassis 10, has a motherboard 30 mounted thereon. The pan 20 is provided with a latch slot 21, a plurality of hooks 22 and a tongue 23. Each of the hooks 22 corresponds to and engages a hook slot 12. The tongue 23 corresponds to and engages the groove 13. By the engagement between the hooks 22 and the hook slots 12, the pan 20 combines with the chassis 10 on both edges. By the engagement between the tongue 23 and the groove 13, the pan 20 combines with the chassis 10 at the front edge.

Figure 2A:
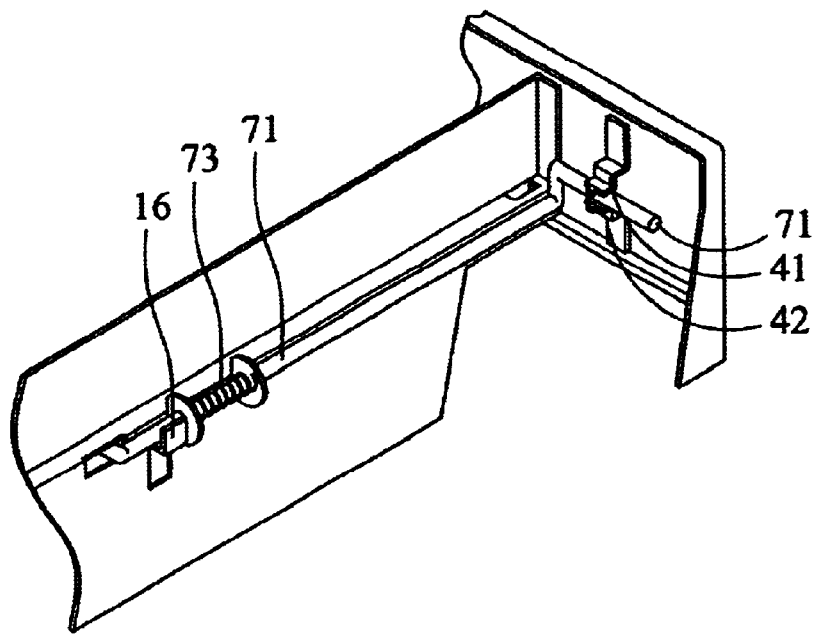
FIG. 2a is a schematic view depicting a first latch as disclosed in this invention.

The first latch 40 is moveably disposed at the chassis 10. Referring to FIG. 1a and FIG. 2a, the first latch 40 is provided with a slide portion 41, protruding from the first port 11, and a hook portion 42 detachably engaging the latch slot 21. Thus, the first latch 40 detachably engages the pan 20 so that the pan 20 combines with the chassis 10. That is, by the engagement between the hook portion 42 and the latch slot 21, the pan 20 combines with the chassis 10 at the rear edge.

Specifically, the pan 20 is mounted upwardly to the chassis 10; that is, the pan 20 can be easily removes from the bottom of the chassis 10.

Figure 2B:
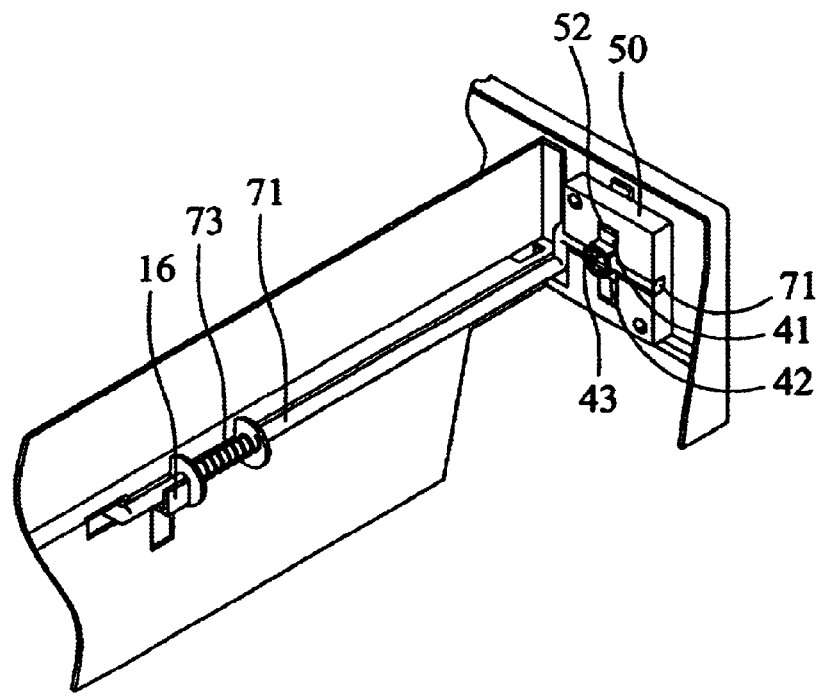
FIG. 2b is a schematic view depicting hooks and hook slots as disclosed in this invention.
Figure 3A:
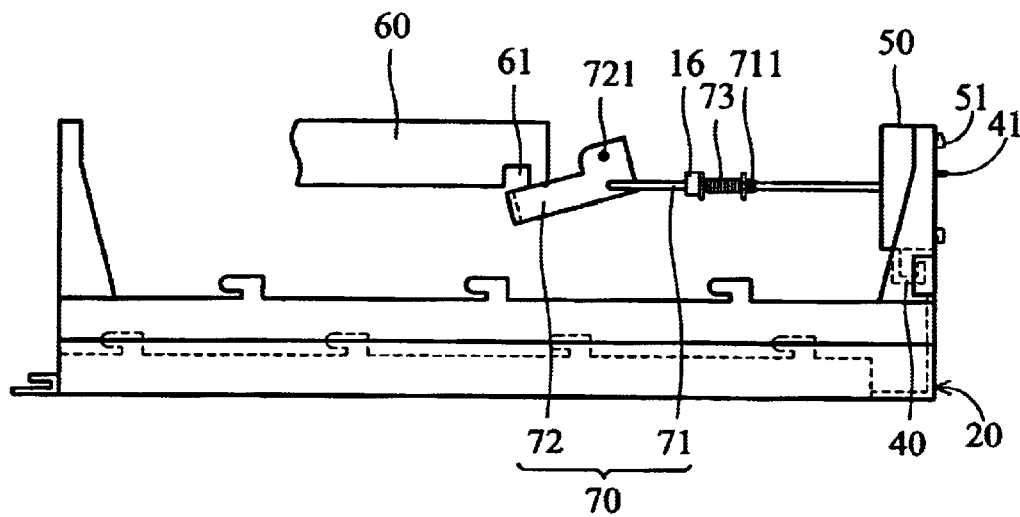
FIG. 3a is a schematic view depicting a security mechanism as disclosed in this invention, wherein a second latch does not lock a hard disk drive.
Figure 3B:
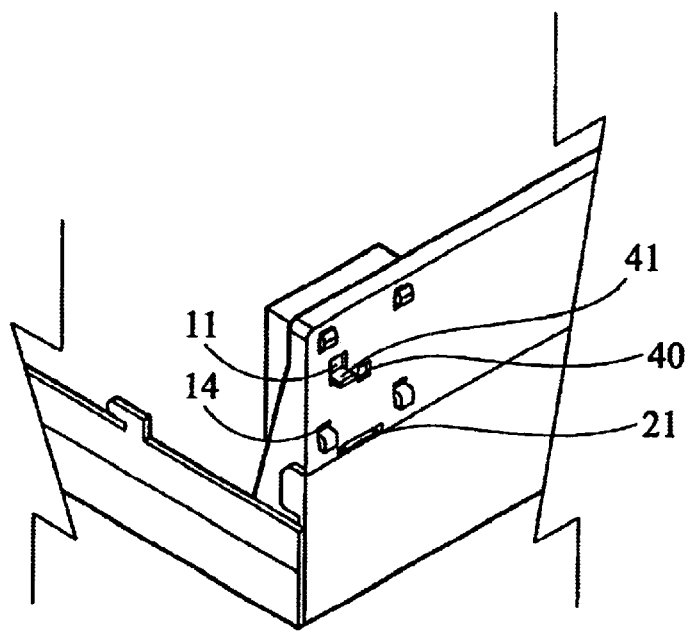
FIG. 3b is another schematic view depicting the security mechanism as disclosed in this invention, wherein a first latch does not engage with the lower pan.
Figure 4:
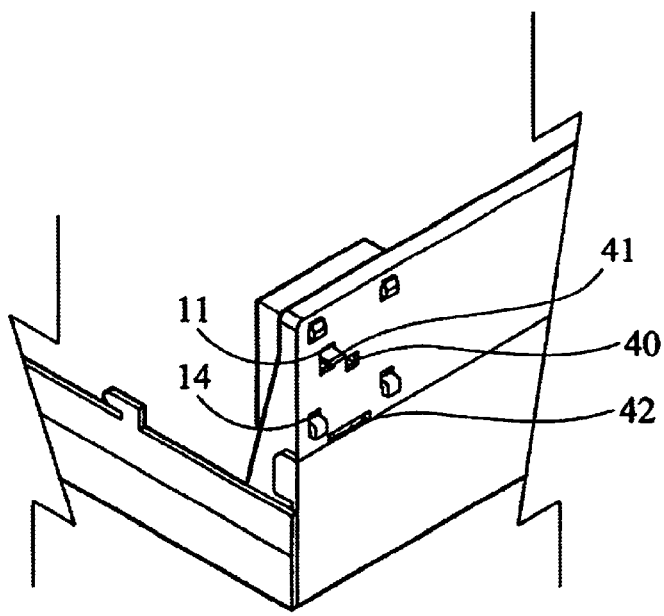
FIG. 4 is another schematic view depicting the security mechanism as disclosed in this invention, wherein the first latch engages the lower pan.
Figure 5:
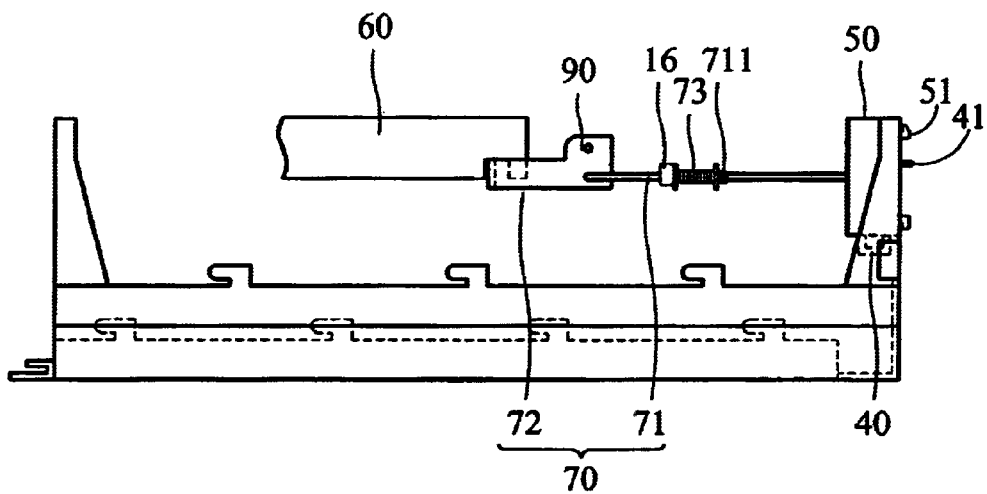
FIG. 5 is another schematic view depicting the security mechanism as disclosed in this invention, wherein the second latch locks the hard disk drive.

In addition, the slide portion 41 and the hook portion 42 are combined together by a retainer 43 as shown in FIG. 2b. The retainer 43 may be an O-ring.

Referring to FIG. 1a and FIG. 2b, the latch housing 50 is used for positioning the first latch 40 and guiding the movement of the first latch 40, and provided with four protrusions 51 corresponding to and engaging the through holes 14. By means of the engagement between the protrusions 51 and the through holes 14, the latch housing 50 is disposed on the chassis 10.

The latch housing 50 is provided with a slide track 52, as shown in FIG. 2b, for guiding the movement of the first latch 40.

By the above structure, to remove the pan 20 from the chassis 10, the first latch 40, disposed on the rear of the chassis 10, is unlatched, and the pan 20 is slid toward the rear and lower it out of the chassis 10. The devices and cables mounted on the motherboard 30, disposed on the pan 20, can be removed and disconnected from the topside.

Referring to FIG. 3a, FIG. 3b, FIG. 4 and FIG. 5, the computer 100 further comprises a hard disk drive 60, and a locking mechanism 70.

The hard disk drive 60 is accessibly disposed on the chassis 10, and provided with a notch 61. The locking mechanism 70 comprises a rod 71, a second latch 72 and a spring 73. The rod 71 is supported by the support 16 and moveably disposed at the chassis 10 and held by the slide portion 41 and the hook portion 42 as shown in FIG. 2b. The second latch 72, connecting to the rod 71, is rotatably disposed at the chassis 10 by a pin 90 as shown in FIG. 1a. That is, the pin 90 passes through the pinhole 17 of the chassis 10 and a pinhole 721 of the second latch 72 so that the second latch 72 is rotatably disposed at the chassis 10. The second latch 72 can engage with the notch 61 of the hard disk drive 60 to lock the hard disk drive 60 inside the computer 100.

Specifically, when the first latch 40 moves downwardly and upwardly, it can rotate the rod 71 of the locking mechanism 70 to move the rod 71 backward or forward. Thus, when the rod 71 moves backward or forward, the second latch 72 rotates downwardly or upwardly to unlock or lock the hard disk drive 60.

The rod 71 is provided with an abutting portion 711, and the spring 73, surrounding the rod 71, abuts the abutting portion 711 and the support 16 of the chassis. Thus, the spring 73 can restrict the rod 71 to move in a predetermined range; that is, the spring 73 can move the rod 71 backward to an original position when the first latch 40 moves downward.

It is noted that the second port 15 is blocked off by the first latch 40 when the first latch 40 does not engage with the pan 20.

The first latch 40 and the locking mechanism 70 consist of a security mechanism of this invention.

The invention has the following advantages:

1. Removal of the motherboard, along with the pan, from the bottom of the chassis, avoids all the obstructions normally associated with the internal components and cables.

2. The security mechanism is designed so that a single external lock secures the entire chassis closed and also secures the user-accessible hard disk drive.

3. There are no screws to remove.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A computer comprising:

a chassis provided with a first port;

a pan, disposed under the chassis and provided with a latch slot, for mounting a motherboard of the computer thereupon; and a first latch, movably disposed at the chassis, for detachably engaging the pan so that the pan combines with the chassis, wherein the first latch is provided with a slide portion, protruding from the first port, and a hook portion detachably engaging the latch slot.

2. The computer as claimed in claim 1, further comprising:

a hard disk drive, accessibly disposed on the chassis; and a locking mechanism, movably disposed at the chassis, connecting to the first latch to lock the hard disk drive by the movement of the first latch.

3. The computer as claimed in claim 2, wherein the locking mechanism comprises:

a rod moveably disposed at the chassis and held by the slide portion and the hook portion of the first latch; and a second latch, connecting to the rod, rotatably disposed at the chassis and used for locking the hard disk drive, whereby the rod moves to rotate the second latch to lock the hard disk drive when the first latch moves to rotate the rod.

4. The computer as claimed in claim 3, wherein the rod is provided with an abutting portion and the chassis is provided with a support, and the locking mechanism further comprises:
a spring, surrounding the rod and abutting the abutting portion and the support, for restricting the rod to move in a predetermined range.

5. The computer as claimed in claim 1, further comprising:
a retainer for connecting the slide portion and the hook portion of the first latch.

6. The computer as claimed in claim 5, wherein the retainer is an O-ring.

7. A computer comprising:
a chassis;
a pan, disposed under the chassis, for mounting a motherboard of the computer thereupon; and
a first latch, movably disposed at the chassis, for detachably engaging the pan so that the pan combines with the chassis;
wherein the chassis is provided with at least one hook slot, and the pan is provided with at least one hook corresponding to and engaging the hook slot.

8. A computer comprising:
a chassis;
a pan, disposed under the chassis, for mounting a motherboard of the computer thereupon; and
a first latch, movably disposed at the chassis, for detachably engaging the pan so that the pan combines with the chassis;
wherein the chassis is provided with at least one groove, and the pan is provided with at least one tongue corresponding to and engaging the groove.

9. A computer comprising:
a chassis;
a pan, disposed under the chassis, for mounting a motherboard of the computer thereupon; and
a first latch, movably disposed at the chassis, for detachably engaging the pan so that the pan combines with the chassis;
a latch housing, disposed on the chassis, for positioning the first latch and guiding the movement of the first latch.

10. The computer as claimed in claim 9, wherein the chassis is provided with at least one through hole, and the latch housing is provided with at least one protrusion corresponding to and engaging the through hole.

11. The computer as claimed in claim 1, wherein the chassis is provided with a second port, and the second port is blocked off by the first latch when the first latch does not engage with the pan.

12. A security mechanism adapted for a computer with a chassis, a pan and a hard disk drive, comprising:
a first latch, movably disposed at the chassis, for detachably engaging the pan so that the pan combines with the chassis; and
a locking mechanism, movably disposed at the chassis, connecting to the first latch to lock the hard disk drive by the movement of the first latch.

13. The security mechanism as claimed in claim 12, wherein the chassis is provided with a first port, and the pan is provided with a latch slot, and the first latch is provided with a slide portion, protruding from the first port, and a hook portion detachably engaging the latch slot.

14. The security mechanism as claimed in claim 13, wherein the locking mechanism comprises:
a rod movably disposed at the chassis and held by the slide portion and the hook portion of the first latch; and
a second latch, connecting to the rod, rotatably disposed at the chassis and used for locking the hard disk drive, whereby the rod moves to rotate the second latch to lock the hard disk drive when the first latch moves to rotate the rod.

15. The security mechanism as claimed in claim 14, wherein the rod is provided with an abutting portion and the chassis is provided with a support, and the locking mechanism further comprises:
a spring, surrounding the rod and abutting the abutting portion and the support, for restricting the rod to move in a predetermined range.

16. The security mechanism as claimed in claim 13, further comprising:
a retainer for connecting the slide portion and the hook portion of the first latch.

17. The security mechanism as claimed in claim 16, wherein the retainer is an O-ring.

18. The security mechanism as claimed in claim 12, further comprising:
a latch housing, disposed on the chassis, for positioning the first latch and guiding the movement of the first latch.

19. The security mechanism as claimed in claim 18, wherein the chassis is provided with at least one through hole, and the latch housing is provided with at least one protrusion corresponding to and engaging the through hole.

* * * * *